United States Patent
Zhao et al.

(10) Patent No.: US 12,224,442 B2
(45) Date of Patent: Feb. 11, 2025

(54) GRAPHITE COMPOSITE NEGATIVE ELECTRODE MATERIAL, PREPARATION METHOD THEREFOR AND APPLICATION THEREOF

(71) Applicant: SVOLT ENERGY TECHNOLOGY CO., LTD., Jiangsu (CN)

(72) Inventors: Xiaofeng Zhao, Changzhou (CN); Jing Liu, Changzhou (CN); Hongxin Yang, Changzhou (CN)

(73) Assignee: SVOLT ENERGY TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,125

(22) PCT Filed: Jul. 20, 2022

(86) PCT No.: PCT/CN2022/106714
§ 371 (c)(1),
(2) Date: Jun. 25, 2024

(87) PCT Pub. No.: WO2023/124025
PCT Pub. Date: Jul. 6, 2023

(65) Prior Publication Data
US 2024/0421306 A1    Dec. 19, 2024

(30) Foreign Application Priority Data

Dec. 28, 2021 (CN) .......................... 202111629432.5

(51) Int. Cl.
| | |
|---|---|
| *H01M 4/583* | (2010.01) |
| *C01B 32/205* | (2017.01) |
| *H01M 4/02* | (2006.01) |
| *H01M 4/04* | (2006.01) |
| *H01M 4/36* | (2006.01) |
| *H01M 10/0525* | (2010.01) |

(52) U.S. Cl.
CPC .......... *H01M 4/583* (2013.01); *C01B 32/205* (2017.08); *H01M 4/0419* (2013.01); *H01M 4/0421* (2013.01); *H01M 4/0471* (2013.01); *H01M 4/366* (2013.01); *H01M 10/0525* (2013.01); *C01P 2004/61* (2013.01); *C01P 2006/11* (2013.01); *H01M 2004/021* (2013.01); *H01M 2004/027* (2013.01)

(58) Field of Classification Search
CPC .. H01M 4/583; H01M 4/0419; H01M 4/0421; H01M 4/0471; H01M 4/366
See application file for complete search history.

(56) References Cited

U.S. PATENT DOCUMENTS

| | | |
|---|---|---|
| 2014/0302394 A1 | 10/2014 | Yue et al. |
| 2020/0295361 A1 | 9/2020 | Takami et al. |
| 2021/0376310 A1 | 12/2021 | Dasgupta et al. |

FOREIGN PATENT DOCUMENTS

| | | |
|---|---|---|
| CN | 101546830 A | 9/2009 |
| CN | 103199254 A | 7/2013 |
| CN | 105304887 A | 2/2016 |
| CN | 105470478 A | 4/2016 |
| CN | 105529465 A | 4/2016 |
| CN | 106356511 A | 1/2017 |
| CN | 108054374 A | 5/2018 |
| CN | 109167049 A | 1/2019 |
| CN | 109473641 A | 3/2019 |
| CN | 109888245 A | 6/2019 |
| CN | 110224111 A | 9/2019 |
| CN | 111697209 A | 9/2020 |
| CN | 112467116 A | 3/2021 |
| CN | 113764644 A | 12/2021 |
| CN | 114300671 A | 4/2022 |
| CN | 114408915 A | 4/2022 |
| GB | 2598432 B | 10/2022 |
| JP | 2021-077445 A | 5/2021 |

OTHER PUBLICATIONS

CN Office Action dated Aug. 8, 2023 as received in Application No. 202111629432.5.
CN Decision to Grant Dated Mar. 21, 2024 as received in Application No. 202111629432.5.
Tang Yulin, "Study on the Preparation and Surface Modification of nano-Ti2Nb10O29 Electrode and Its Lithiation/deliatiation Behavior," Partial Fulfillment of the Requirement for the Master Degree in Materials Engineering, (Jun. 2020).

*Primary Examiner* — Nathanael T Zemui
(74) *Attorney, Agent, or Firm* — Maschoff Brennan

(57) ABSTRACT

A graphite composite negative electrode material, a preparation method therefor and an application thereof. A coating layer formed by mixing a plurality of substances is coated on the surface of graphite, the high theoretical specific capacity of titanium niobate is utilized, and carbon nanotubes and amorphous carbon are added in an auxiliary manner, the carbon nanotubes form a network structure, and the amorphous carbon stabilizes the structure of the material, which jointly improve the structural stability of the material in the charging and discharging process, and improve the first efficiency and the cycle performance of the material.

16 Claims, 1 Drawing Sheet

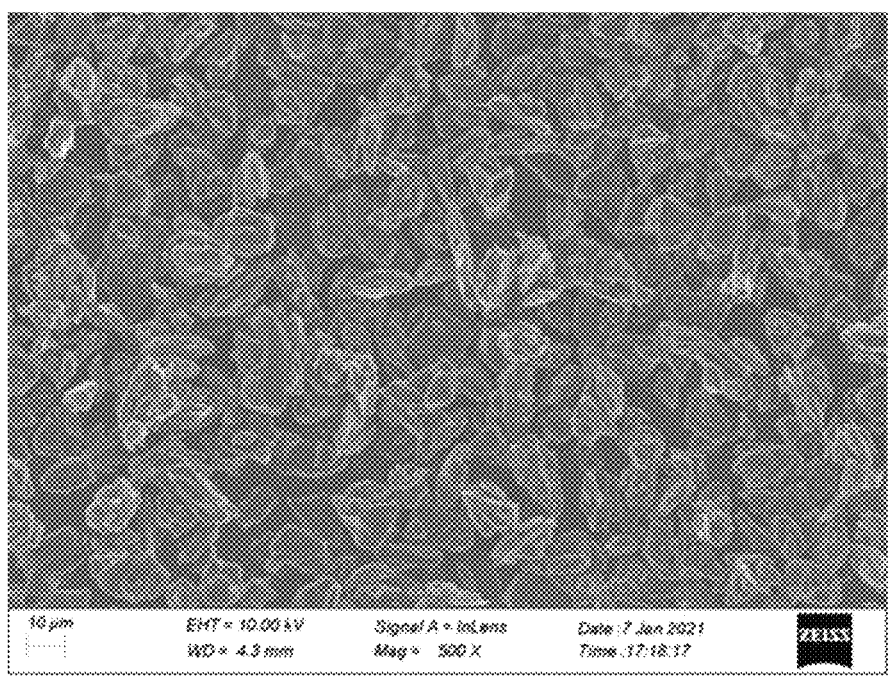

GRAPHITE COMPOSITE NEGATIVE ELECTRODE MATERIAL, PREPARATION METHOD THEREFOR AND APPLICATION THEREOF

FIELD OF THE INVENTION

This disclosure relates to the technical field of graphite negative electrode materials, for example, a graphite composite negative electrode material and its preparation method and application.

BACKGROUND OF THE INVENTION

Graphite materials are widely used in lithium-ion batteries due to their advantages such as wide range of material sources and high cycling performance. However, their layered structure of materials leads to high rate charging and discharging, and the intercalation and deintercalation path of lithium ions is longer, resulting in rate performance deviation. Although there are ways in the market to improve the power performance of materials by reducing their aggregate particle size and surface coating of the materials, the improvement effect is general and does not fundamentally improve the power performance of materials. There are research institutions in China that use phenolic resin to conduct primary modification to the natural graphite. Although this modification method can improve the specific capacity and recycling rate of graphite materials, there are still serious defects as follows: (1) phenolic resin is prone to form a settling adhesive system during stirring or volatilization, resulting in its uneven coating on the surface of graphite; (2) the surface of graphite coated with primary phenolic resin will have holes, and some areas even are not coated, resulting in the graphite being exposed, which may contact with the electrolyte solution, causing generation of irreversible capacity, leading to a decrease in graphite cycling performance. Therefore, how to improve the electrochemical performance, especially the fast charging performance and first efficiency, of graphite negative electrode materials, is an urgent technical problem to be solved.

SUMMARY OF INVENTION

This disclosure provides a graphite composite negative electrode material, a preparation method therefor, and an application thereof.

This disclosure provides a graphite composite negative electrode material in an embodiment, wherein the graphite composite negative electrode material includes a core and a coating layer which is coated on the surface of the core. The core includes graphite material, and the coating layer includes titanium niobate, carbon nanotubes, and amorphous carbon.

In an embodiment provided by the present disclosure, by coating the surface of graphite with a coating layer of mixed various substances and utilizing the relatively high theoretical specific capacity of titanium niobate, the lattice parameters and cell volume during the lithium ion deintercalation process have relatively small changes and high reversibility. Moreover, its charge and discharge potential is around 1.6V, which makes it not easy to generate SEI films and lithium dendrites during the cycling process. At the same time, it assists in the addition of carbon nanotubes and amorphous carbon, the carbon nanotubes form a network structure, and the amorphous carbon stabilizes the structure of materials, jointly improving the stability of the material's structure during the charge and discharge process, and enhancing the material's first efficiency, power, and cycling performance.

In an embodiment provided in this disclosure, if only pure titanium niobate is used for coating, there will be problems of low electronic conductivity and poor processing.

In an embodiment, based on 100% of the mass of the graphite composite negative electrode material, a ratio of the mass of the coating layer is 1-10%, such as 1%, 2%, 3%, 4%, 5%, 6%, 7%, 8%, 9%, or 10%, etc.

In an embodiment, based on 100% of the mass of the coating layer, a ratio of the mass of the titanium niobate is 10-50%, such as 10%, 15%, 20%, 25%, 30%, 35%, 40%, 45%, or 50%, etc.

In one embodiment, based on 100% of the mass of the coating layer, a ratio of the mass of the carbon nanotubes is 1-5%, such as 1%, 2%, 3%, 4%, or 5%, etc.

In one embodiment, the chemical formula of titanium niobate is $Ti_{1-x}Nb_xO_7$, $0<x<1$, such as x is 0.1, 0.2, 0.3, 0.4, 0.5, 0.6, 0.7, 0.8, or 0.9, etc.

In an embodiment, the specific surface area of the graphite composite negative electrode material is 0.5-10 $m^2/g$, such as 0.5 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, or 10 $m^2/g$, etc.

In one embodiment, the specific surface area of the graphite composite negative electrode material is 1-5 $m^2/g$, such as 1 $m^2/g$, 2 $m^2/g$, 3 $m^2/g$, 4 $m^2/g$, or 5 $m^2/g$, etc.

In one embodiment, the median particle size of the graphite composite negative electrode material is 5-20 μm, for example, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm or 20 μm, etc.

In one embodiment, the median particle size of the graphite composite negative electrode material is 9-15 μm, for example, 9 μm, 10 μm, 11 μm, 12 μm, 13 μm, 14 μm, or 15 μm, etc.

In one embodiment, the tap density of the graphite composite negative electrode material is 0.6-1.4 $g/cm^3$, such as 0.6 $g/cm^3$, 0.7 $g/cm^3$, 0.8 $g/cm^3$, 0.9 $g/cm^3$, 1 $g/cm^3$, 1.1 $g/cm^3$, 1.2 $g/cm^3$, 1.3 $g/cm^3$, or 1.4 $g/cm^3$, etc.

In one embodiment, the tap density of the graphite composite negative electrode material is 0.9-1.2 $g/cm^3$, such as 0.9 $g/cm^3$, 1 $g/cm^3$, 1.1 $g/cm^3$, or 1.2 $g/cm^3$, etc.

The present disclosure provides a preparation method for a graphite composite negative electrode material in an embodiment, wherein the negative electrode material is a graphite negative electrode material in the embodiment, and the preparation method comprises the following steps:

(1) mixing a titanium source, a niobium source, an asphalt and a solvent, spray drying and sintering to obtain a pre-coating material;

(2) mixing the pre-coating material in step (1) with a solution of a metal catalyst to obtain a mixture, and compositing a carbon source with the mixture through a vapor deposition to obtain a coating layer material; and (3) mixing the coating layer material in step (2) with a graphite material, granulating, and carbonizing to obtain the graphite composite negative electrode material.

In an embodiment provided by the present disclosure, by coating a compound containing titanium niobate on the surface of graphite and utilizing the relatively high theoretical specific capacity of titanium niobate, the lattice parameters and cell volume during the lithium ion deintercalation process have relatively small changes and high reversibility. Moreover, its charge and discharge potential is around 1.6V, which makes it not easy to generate SEI films and lithium dendrites during the cycling process, improving the first efficiency, power, and cycling performance of the material. At the same time, by infiltrating catalysts into the coating layer and using vapor deposition method to grow carbon nanotubes in titanium niobate and its amorphous carbon, the electronic conductivity of the material is improved, and the network structure formed by the carbon nanotubes is improved, which improves the structural stability of the material during the charging and discharging process and enhances cycling.

In an embodiment provided by the present disclosure, step (1) is a pre-carbonization process, and auxiliary step (3) of carbonization is required to fully achieve the conversion of carbon source and asphalt.

In an embodiment provided in this disclosure, the addition of asphalt can better improve processing performance. Without the addition of asphalt, it is difficult to achieve uniform coating of titanium niobate on the surface of the core, and the contact between titanium niobate and carbon nanotubes is poor.

In an embodiment provided in this disclosure, without the addition of catalysts, it is not possible to obtain a network structure of carbon nanotubes, which also makes it difficult to improve the power performance of the material and leads to a higher electronic impedance.

In one embodiment, the titanium source in step (1) includes titanium dioxide.

In an embodiment, the niobium source in step (1) includes any one or a combination of at least two of niobium pentoxide ($Nb_2O_5$), niobium trioxide ($Nb_2O_3$), niobium oxide, and niobium hydroxide.

In one embodiment, the solvent described in step (1) includes any one or a combination of at least two of carbon tetrachloride, n-hexane, xylene, N-methylpyrrolidone, and tetrahydrofuran.

In an embodiment, the mass ratio of titanium source, niobium source, and asphalt in step (1) is (1-5):(10-50):100, such as 1:10:100, 1:30:100, 1:50:100, 3:10:100, 3:30:100, 3:50:100, 5:10:100, 5:30:100, or 5:50:100, etc.

In an embodiment, the sintering in step (1) is carried out at a temperature ranging from 600° C. to 1000° C., such as 600° C., 700° C., 800° C., 900° C., or 1000° C., etc.

In one embodiment, the sintering in step (1) is carried out for a time period ranging from 1 hour to 6 hours, such as 1 hour, 2 hours, 3 hours, 4 hours, 5 hours, or 6 hours, etc.

In an embodiment, the median particle size of the metal catalyst in step (2) is 10-500 nm, such as 10 nm, 50 nm, 100 nm, 150 nm, 200 nm, 250 nm, 300 nm, 350 nm, 400 nm, 450 nm, or 500 nm.

In one embodiment, the metal catalyst in step (2) includes any one or a combination of at least two of nano-iron, nano-nickel, and nano-cobalt.

In one embodiment, in step (2), the mass ratio of the pre-coating material to the metal catalyst is 100:(0.5-2), such as 100:0.5, 100:1, 100:1.5, or 100:2, etc.

In one embodiment, the mixing in step (2) is carried out for a time period ranging from 1 hour to 24 hours, such as 1 hour, 2 hours, 5 hours, 8 hours, 10 hours, 13 hours, 15 hours, 18 hours, 20 hours, 22 hours, or 24 hours, etc.

In one embodiment, the mixed substances described in step (2) are sequentially filtered and vacuum dried to obtain a mixture.

In an embodiment, the temperature for vapor deposition in step (2) is in a range from 600° C. to 1000° C., such as 600° C., 700° C., 800° C., 900° C., or 1000° C., etc.

In an embodiment, the vapor deposition in step (2) is carried out for a time period ranging from 1 hour to 12 hours, such as 1 hour, 2 hours, 3 hours, 4 hours, 5 hours, 6 hours, 7 hours, 8 hours, 9 hours, 10 hours, 11 hours, or 12 hours, etc.

In an embodiment, the carbon source for vapor deposition in step (2) includes any one or a combination of at least two of methane, ethane, ethylene, acetylene, propane, and propylene.

In an embodiment, in step (3), the mass ratio of the coating layer material to the graphite material is (1-10):100, such as 1:100, 2:100, 3:100, 4:100, 5:100, 6:100, 7:100, 8:100, 9:100, or 10:100, etc.

In an embodiment, the mixing in step (3) is carried out for a time period ranging from 30 minutes to 120 minutes, such as 30 minutes, 40 minutes, 50 minutes, 60 minutes, 70 minutes, 80 minutes, 90 minutes, 100 minutes, 110 minutes, or 120 minutes, etc.

In an embodiment, the granulating in step (3) is carried out at a temperature ranging from 600° C. to 800° C., such as 600° C., 650° C., 700° C., 750° C., or 800° C., etc.

In one embodiment, the granulating in step (3) is carried out for a time period ranging from 1 hour to 6 hours, such as 1 hour, 2 hours, 3 hours, 4 hours, 5 hours, or 6 hours, etc.

In an embodiment, the carbonizing in step (3) is carried out at a temperature ranging from 1000° C. to 1300° C., such as 1000° C., 1050° C., 1100° C., 1150° C., 1200° C., 1250° C., or 1300° C., etc.

In an embodiment, the carbonizing in step (3) is carried out for a time period ranging from 6 hours to 24 hours, such as 6 hours, 8 hours, 10 hours, 12 hours, 15 hours, 18 hours, 20 hours, 22 hours, or 24 hours, etc.

In an embodiment, the preparation method comprises the following steps:
(1) mixing a titanium source, a niobium source and an asphalt in a mass ratio of (1-5):(10-50):100 with a solvent, spray drying and sintering at 600° C. to 1000° C. for 1 hour to 6 hours to obtain a pre-coating material;
(2) mixing the pre-coating material in step (1) with a solution of a metal catalyst with a median particle size of 10 nm to 500 nm in a mass ratio of the pre-coating material to the metal catalyst of 100:(0.5-2) for 1 hour to 24 hours to obtain a mixture, and compositing a carbon source with the mixture at 600° C. to 1000° C. for 1 hour to 12 hours in a manner of a vapor deposition to obtain a coating layer material; and
(3) mixing the coating layer material in step (2) with a graphite material in a mass ratio of (1-10):100 for 30 minutes to 120 minutes, granulating at 600° C. to 800° C. for 1 hour to 6 hours, and carbonizing at a temperature of 1000° C. to 1300° C. for 6 hours to 24 hours to obtain the graphite composite negative electrode material.

This disclosure relates to a lithium-ion battery in an embodiment, wherein the lithium-ion battery has the graphite composite negative electrode material as described in an embodiment.

BRIEF DESCRIPTION OF THE DRAWINGS

The accompanying drawings are used to provide a further understanding of the technical solution of this application and constitute a part of the specification. They are used together with the examples of this application to explain the technical solution of this application and do not constitute a limitation on the technical solution of this application.

FIG. 1 shows the SEM image of the graphite composite negative electrode material provided in Example 1.

DETAILED DESCRIPTION OF THE INVENTION

This disclosure provides a graphite composite negative electrode material in an embodiment, wherein the graphite composite negative electrode material includes a core and a coating layer which is coated on the surface of the core. The core includes graphite material, and the coating layer includes titanium niobate, carbon nanotubes, and amorphous carbon.

In an embodiment provided by the present disclosure, by coating the surface of graphite with a coating layer of mixed various substances and utilizing the relatively high theoretical specific capacity of titanium niobate, the lattice parameters and cell volume during the lithium ion deintercalation process have relatively small changes and high reversibility. Moreover, its charge and discharge potential is around 1.6V, which makes it difficult to generate SEI films and lithium dendrites during the cycling process. At the same time, it assists in the addition of carbon nanotubes and amorphous carbon, the carbon nanotubes form a network structure, and the amorphous carbon stabilizes the structure of materials, jointly improving the stability of the material's structure during the charge and discharge process, and enhancing the material's first efficiency, power, and cycling performance.

In an embodiment provided in this disclosure, if only pure titanium niobate is used for coating, there will be problems of low electronic conductivity and poor processing.

In an embodiment, based on 100% of the mass of the graphite composite negative electrode material, a ratio of the mass of the coating layer is 1-10%, such as 1%, 2%, 3%, 4%, 5%, 6%, 7%, 8%, 9%, or 10%, etc.

In an embodiment, based on 100% of the mass of the coating layer, a ratio of the mass of the titanium niobate is 10-50%, such as 10%, 15%, 20%, 25%, 30%, 35%, 40%, 45%, or 50%, etc.

In an embodiment provided by the present disclosure, if a ratio of the mass of titanium niobate is too large, the electronic impedance will be too high, and the voltage platform is too high, which is not conducive to fast charging and energy density improvement. However, if a ratio of the mass is too small, the effect of improving ion conductivity is not obvious, which will lead to no improvement in fast charging performance and deviation in its cycling performance.

In one embodiment, based on 100% of the mass of the coating layer, a ratio of the mass of the carbon nanotubes is 1-5%, such as 1%, 2%, 3%, 4%, or 5%, etc.

In an embodiment provided in this disclosure, if the mass fraction of carbon nanotubes is too large, it will affect the first efficiency and high-temperature performance of the material. However, if the mass fraction is too small, it cannot form a network structure, and the amplitude of electronic conductivity is not significant and the temperature rise is too high.

In one embodiment, the chemical formula of titanium niobate is $Ti_{1-x}Nb_xO_7$, $0<x<1$, such as x is 0.1, 0.2, 0.3, 0.4, 0.5, 0.6, 0.7, 0.8, or 0.9, etc.

In an embodiment, the specific surface area of the graphite composite negative electrode material is 0.5-10 m²/g, such as 0.5 m²/g, 1 m²/g, 2 m²/g, 3 m²/g, 4 m²/g, 5 m²/g, 6 m²/g, 7 m²/g, 8 m²/g, 9 m²/g, or 10 m²/g, etc.

In one embodiment, the specific surface area of the graphite composite negative electrode material is 1-5 m²/g, such as 1 m²/g, 2 m²/g, 3 m²/g, 4 m²/g, or 5 m²/g, etc.

In one embodiment, the median particle size of the graphite composite negative electrode material is 5-20 μm, for example, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm or 20 μm, etc.

In one embodiment, the median particle size of the graphite composite negative electrode material is 9-15 μm, for example, 9 μm, 10 μm, 11 μm, 12 μm, 13 μm, 14 μm or 15 μm, etc.

In one embodiment, the tap density of the graphite composite negative electrode material is 0.6-1.4 g/cm³, such as 0.6 g/cm³, 0.7 g/cm³, 0.8 g/cm³, 0.9 g/cm³, 1 g/cm³, 1.1 g/cm³, 1.2 g/cm³, 1.3 g/cm³, or 1.4 g/cm³, etc.

In one embodiment, the tap density of the graphite composite negative electrode material is 0.9-1.2 g/cm³, such as 0.9 g/cm³, 1 g/cm³, 1.1 g/cm³, or 1.2 g/cm³, etc.

The present disclosure provides a method for preparing a graphite composite negative electrode material in an embodiment, wherein the negative electrode material is the graphite negative electrode material in an embodiment, and the method for preparing a graphite composite negative electrode material comprises the following steps:
 (1) mixing a titanium source, a niobium source, an asphalt and a solvent, spray drying and sintering to obtain a pre-coating material;
 (2) mixing the pre-coating material in step (1) with a solution of a metal catalyst to obtain a mixture, and compositing a carbon source with the mixture in a manner of vapor deposition to obtain a coating layer material; and
 (3) mixing the coating layer material in step (2) with a graphite material, granulating, and carbonizing to obtain the graphite composite negative electrode material.

In an embodiment provided by the present disclosure, by coating a compound containing titanium niobate on the surface of graphite and utilizing the relatively high theoretical specific capacity of titanium niobate, the lattice parameters and cell volume during the lithium ion deintercalation process have relatively small changes and high reversibility. Moreover, its charge and discharge potential is around 1.6V, which makes it not easy to generate SEI films and lithium dendrites during the cycling process, improving the first efficiency, power, and cycling performance of the material. At the same time, by infiltrating catalysts into the coating layer and using vapor deposition method to grow carbon nanotubes in titanium niobate and its amorphous carbon, the electronic conductivity of the material is improved, and the network structure formed by the carbon nanotubes is improved, which improves the structural stability of the material during the charging and discharging process and enhances cycling.

In an embodiment provided by the present disclosure, step (1) is a pre-carbonization process, and auxiliary step (3) of carbonization is required to fully achieve the conversion of carbon source and asphalt.

In an embodiment provided in this disclosure, the addition of asphalt can better improve processing performance. Without the addition of asphalt, it is difficult to achieve uniform coating of titanium niobate on the surface of the core, at the same time the contact between titanium niobate and carbon nanotubes is poor.

In an embodiment provided in this disclosure, without the addition of catalysts, it is not possible to obtain a network structure of carbon nanotubes, which also makes it difficult to improve the power performance of the material and leads to a higher electronic impedance.

In one embodiment, the titanium source in step (1) includes titanium dioxide.

In an embodiment, the niobium source in step (1) includes any one or a combination of at least two of niobium pentoxide ($Nb_2O_5$), niobium trioxide ($Nb_2O_3$), niobium oxide, and niobium hydroxide.

In one embodiment, the solvent described in step (1) includes any one or a combination of at least two of carbon tetrachloride, n-hexane, xylene, N-methylpyrrolidone, and tetrahydrofuran.

In an embodiment, the mass ratio of titanium source, niobium source, and asphalt in step (1) is (1-5):(10-50):100, such as 1:10:100, 1:30:100, 1:50:100, 3:10:100, 3:30:100, 3:50:100, 5:10:100, 5:30:100, or 5:50:100, etc.

In an embodiment, the sintering in step (1) is carried out at a temperature ranging from 600° C. to 1000° C., such as 600° C., 700° C., 800° C., 900° C., or 1000° C., etc.

In an embodiment provided by the present disclosure, if the temperature of sintering in step (1) is too low, it will affect the coating effect of amorphous carbon, that is, the coating is uneven, and if the temperature of sintering is too high, it will cause the amorphous carbon to become more ordered and the impedance will increase.

In one embodiment, the sintering in step (1) is carried out for a time period ranging from 1 hour to 6 hours, such as 1 hour, 2 hours, 3 hours, 4 hours, 5 hours, or 6 hours, etc.

In an embodiment, the median particle size of the metal catalyst in step (2) is 10-500 nm, such as 10 nm, 50 nm, 100 nm, 150 nm, 200 nm, 250 nm, 300 nm, 350 nm, 400 nm, 450 nm, or 500 nm.

In an embodiment provided by the present disclosure, if the median particle size of the metal catalyst is too large, it is not conducive to the generation of carbon nanotubes and affects the amount of carbon nanotubes generated, resulting in a deviation in catalytic performance and prolonging the generation time of carbon nanotubes.

In one embodiment, the metal catalyst in step (2) includes any one or a combination of at least two of nano-iron, nano-nickel, and nano-cobalt.

In one embodiment, in step (2), the mass ratio of the pre-coating material to the metal catalyst is 100:(0.5-2), such as 100:0.5, 100:1, 100:1.5, or 100:2, etc.

In an embodiment provided by the present disclosure, if the mass ratio of the pre-coating material to the metal catalyst is too large, that is, if the amount of the metal catalyst is too small, the amount of carbon nanotubes generated is too small. If the metal catalyst is added too much, it will lead to a high content of magnetic impurities in the material, affecting the self-discharge of the material.

In one embodiment, the mixing in step (2) is carried out for a time period ranging from 1 hour to 24 hours, such as 1 hour, 2 hours, 5 hours, 8 hours, 10 hours, 13 hours, 15 hours, 18 hours, 20 hours, 22 hours, or 24 hours, etc.

In one embodiment, the mixed substances described in step (2) are sequentially filtered and vacuum dried to obtain a mixture.

In an embodiment, the temperature for vapor deposition in step (2) is in a range from 600° C. to 1000° C., such as 600° C., 700° C., 800° C., 900° C., or 1000° C., etc.

In an embodiment provided by the present disclosure, if the temperature for vapor deposition in step (2) is too low, it will affect the quality of carbon nanotube generated (i.e., the pipe diameter is too large and the pipe length is relatively small), and if the temperature for vapor deposition is too high, it will cause the carbon nanotube to self-aggregate.

In an embodiment, the vapor deposition in step (2) is carried out for a time period ranging from 1 hour to 12 hours, such as 1 hour, 2 hours, 3 hours, 4 hours, 5 hours, 6 hours, 7 hours, 8 hours, 9 hours, 10 hours, 11 hours, or 12 hours, etc.

In an embodiment, the carbon source for vapor deposition in step (2) includes any one or a combination of at least two of methane, ethane, ethylene, acetylene, propane, and propylene.

In an embodiment, in step (3), the mass ratio of the coating layer material to the graphite material is (1-10):100, such as 1:100, 2:100, 3:100, 4:100, 5:100, 6:100, 7:100, 8:100, 9:100, or 10:100, etc.

In an embodiment, the mixing in step (3) is carried out for a time period ranging from 30 minutes to 120 minutes, such as 30 minutes, 40 minutes, 50 minutes, 60 minutes, 70 minutes, 80 minutes, 90 minutes, 100 minutes, 110 minutes, or 120 minutes, etc.

In an embodiment, the granulating in step (3) is carried out at a temperature ranging from 600° C. to 800° C., such as 600° C., 650° C., 700° C., 750° C., or 800° C., etc.

In one embodiment, the granulating in step (3) is carried out for a time period ranging from 1 hour to 6 hours, such as 1 hour, 2 hours, 3 hours, 4 hours, 5 hours, or 6 hours, etc.

In an embodiment, the carbonizing in step (3) is carried out at a temperature ranging from 1000° C. to 1300° C., such as 1000° C., 1050° C., 1100° C., 1150° C., 1200° C., 1250° C., or 1300° C., etc.

In an embodiment, the carbonizing in step (3) is carried out for a time period ranging from 6 hours to 24 hours, such as 6 hours, 8 hours, 10 hours, 12 hours, 15 hours, 18 hours, 20 hours, 22 hours, or 24 hours, etc.

In an embodiment, the preparation method comprises the following steps:
(1) mixing a titanium source, a niobium source and an asphalt in a mass ratio of (1-5):(10-50):100 with a solvent, spray drying and sintering at 600° C. to 1000° C. for 1 hour to 6 hours to obtain a pre-coating material;
(2) mixing the pre-coating material in step (1) with a solution of a metal catalyst with a median particle size of 10 nm to 500 nm in a mass ratio of the pre-coating material to the metal catalyst of 100:(0.5-2) for 1 hour to 24 hours to obtain a mixture, and compositing a carbon source with the mixture at 600° C. to 1000° C. for 1 hour to 12 hours in a manner of a vapor deposition to obtain a coating layer material; and
(3) mixing the coating layer material in step (2) with a graphite material in a mass ratio of (1-10):100 for 30 minutes to 120 minutes, granulating at 600° C. to 800° C. for 1 hour to 6 hours, and carbonizing at a temperature of 1000° C. to 1300° C. for 6 hours to 24 hours to obtain the graphite composite negative electrode material.

This disclosure relates to a lithium-ion battery in an embodiment, which has the graphite composite negative electrode material as described in an embodiment.

Example 1

This example provides a graphite composite negative electrode material, which includes a core and a coating layer which is coated on the surface of the core. The core is an artificial graphite material, and the coating layer is composed of titanium niobate (chemical formula $Ti_{0.05}Nb_{0.95}O_7$), carbon nanotubes, and amorphous carbon.

Based on 100% of the mass of the graphite composite negative electrode material, a ratio of the mass of the coating layer is 5%; and based on 100% the mass of the coating layer, a ratio of the mass of titanium niobate is 20%, and a ratio of the mass of carbon nanotubes is 3%.

The method for preparing the graphite composite negative electrode material is as follows:
(1) 3 g of titanium dioxide, 30 g of niobium pentoxide ($Nb_2O_5$) and 100 g of asphalt were weighed and added into 2600 ml of carbon tetrachloride organic solvent to make the content to be 5 wt %, and the materials were ball milled, spray dried, and sintered at 800° C. for 3 h, and crushed to obtain a pre-coating material;
(2) 100 g of the pre-coating material was soaked in 100 ml of carbon tetrachloride catalyst solution with 1 wt % nano-iron (median particle size 50 nm) for 12 hours, and the materials were filtered and vacuum dried at 80° C. for 24 hours. Afterwards, the obtained material was transferred to a tube furnace and the air inside the tube was discharged in a nitrogen atmosphere. Thereafter, methane gas was introduced, and the material was heated to 800° C. and kept at this temperature for 6 hours, and then cooled to room temperature in a nitrogen atmosphere to obtain a coating layer material; and
(3) 5 g of the coating layer material in step (2) and 100 g artificial graphite were put into a fusion machine, the materials were mixed at a speed of 40 Hz/min for 60 min, and then the mixture was added into a high-speed mixer for high-speed granulation, modification, and mixing. The granulation temperature was 700° C., and the granulation time was 3 h. Afterwards, under the protection of argon inert gas, carbonization treatment was carried out in a calciner at 1200° C. for 12 hours to obtain the granulated graphite composite material.

FIG. 1 shows the SEM image of the graphite composite negative electrode material provided in Example 1. The graphite composite negative electrode material prepared in Example 1 was subjected to SEM testing, and it can be seen from FIG. 1 that the resulting composite materials are present in granular shape with a particle size between 10 μm and 20 μm, and the size distribution is uniform.

Example 2

This example provides a graphite composite negative electrode material, which includes a core and a coating layer which is coated on the surface of the core. The core is an artificial graphite material, and the coating layer is composed of titanium niobate (chemical formula $Ti_{0.01}Nb_{0.99}O_7$), carbon nanotubes, and amorphous carbon.

Based on 100% of the mass of the graphite composite negative electrode material, a ratio of the mass of the coating layer is 5%; and based on 100% of the mass of the coating layer, a ratio of the mass of titanium niobate is 10%, and a ratio of the mass of carbon nanotubes is 1%.

The method for preparing the graphite composite negative electrode material is as follows:
(1) 1 g of titanium dioxide, 10 g of niobium trioxide ($Nb_2O_3$) and 100 g of asphalt were weighed and added into 1111 ml of N-methylpyrrolidone organic solvent to make the content to be 1 wt %, and the materials were ball milled, spray dried, and sintered at 600° C. for 6 h, and crushed to obtain a pre-coating material;
(2) 100 g of the pre-coating material was soaked in 50 ml of N-methylpyrrolidone solution with 0.1 wt % nano-nickel (with a median particle size of 500 nm) for 1 hour, and the materials were filtered and vacuum dried at 80° C. for 24 hours. Then the obtained material was transfer to a tube furnace and the air inside the tube is discharged in a nitrogen atmosphere. Then, acetylene gas was introduced, and the material was heated to 600° C. and kept at the temperature for 12 hours, and then cooled down to room temperature under nitrogen atmosphere to obtain a coating layer material; and
(3) 1 g of the coating layer material in step (1) and 100 g of artificial graphite were put into a fusion machine, the materials were mixed at a speed of 40 Hz/min for 30 min, and then the mixture was added into a high-speed mixer for high-speed granulation, modification, and mixing. The granulation temperature was 600° C., and the granulation time was 6 hours. Afterwards, under the protection of argon inert gas, the material was heated in a calciner for carbonization treatment, and kept at a constant temperature of 1000° C. for 24 hours to obtain the granulated graphite composite material.

Example 3

This example provides a graphite composite negative electrode material, which includes a core and a coating layer which is coated on the surface of the core. The core is an artificial graphite material, and the coating layer is composed of titanium niobate (chemical formula $Ti_{0.95}Nb_{0.05}O_7$), carbon nanotubes, and amorphous carbon.

Based on 100% of the mass of the graphite composite negative electrode material, a ratio of the mass of the coating layer is 5%; and based on 100% of the mass of the coating layer, a ratio of the mass of titanium niobate is 50%, and a ratio of the mass of carbon nanotubes is 5%.

The method for preparing the graphite composite negative electrode material is as follows:
(1) 5 g of titanium dioxide, 50 g of niobium hydroxide and 100 g of asphalt were weighed and added into 1555 ml of n-hexane organic solvent to make the content to be 10 wt %, and the materials were ball milled, spray dried, sintered at 1000° C. for 1 h, and crushed to obtain a pre-coating material;
(2) 100 g of the pre-coating material was soaked in 100 ml of n-hexane catalyst solution with 2 wt % nano-cobalt (with a median particle size of 100 nm) for 24 hours, and the materials were filtered and vacuum dried at 80° C. for 24 hours. Then the obtained material was transferred to a tube furnace and the air inside the tube was discharged in a nitrogen atmosphere. Then, ethylene gas was introduced and the material was heated to 1000° C. and kept at this temperature for 1 hour, and then cooled to room temperature in a nitrogen atmosphere to obtain a coating layer material; and
(3) 10 g of the coating layer material in step (1) and 100 g of graphite were put into a fusion machine, the materials were mixed at a speed of 40 Hz/min for 120 min, and then the mixture was added into a high-speed mixer for high-speed granulation, modification, and mixing. The granulation temperature was 800° C., and the granulation time was 1 hour. Afterwards, under the protection of argon inert gas, the material was heated in a calciner for carbonization treatment, and kept at a constant temperature of 1300° C. for 6 hours to obtain the granulated graphite composite material.

Example 4

The difference between this example and Example 1 is that in this example, based on 100% of the mass of the coating layer, a ratio of the mass of titanium niobate is 5%, and the mass of titanium dioxide and niobium pentoxide ($Nb_2O_5$) in the preparation method is adjusted adaptively.

The other steps and parameters in the preparation method are consistent with that of Example 1.

Example 5

The difference between this example and Example 1 is that in this example, based on 100% of the mass of the coating layer, a ratio of the mass of titanium niobate is 55%, and the mass adjustment of titanium dioxide and niobium pentoxide ($Nb_2O_5$) in the preparation method is adjusted adaptively.

The other steps and parameters in the preparation method are consistent with that of Example 1.

Example 6

The difference between this example and Example 1 is that in this example, based on 100% of the mass of the coating layer, a ratio of the mass of carbon nanotubes is 15%, and the mass of titanium dioxide and niobium pentoxide ($Nb_2O_5$) in the preparation method is adjusted adaptively.

The other steps and parameters in the preparation method are consistent with that of Example 1.

Comparative Example 1

This Comparative Example provides a graphite composite negative electrode material, which includes an artificial graphite core and an amorphous carbon coating layer located on the surface of the core.

The method for preparing the graphite composite negative electrode material is as follows:

10 g of asphalt was added into 100 ml of n-hexane organic solvent to make the content to be 10 wt %, and the materials were ball milled, and then 100 g of artificial graphite was added. The materials were mixed at a speed of 40 Hz/min for 30 minutes, and then the mixture was added into a high-speed mixer for high-speed granulation, modification, and mixing, in which the granulation temperature was 600° C., and the granulation time was 6 hours. Afterwards, under the protection of argon inert gas, the material was heated in a calciner for carbonization treatment, and kept at a constant temperature of 1000° C. for 24 hours to obtain the granulated graphite composite material.

Comparative Example 2

The difference between this Comparative Example and Example 1 is that there are only amorphous carbon and titanium niobate in the coating layer of this Comparative Example.

In the preparation method, in step (2), nano-iron was not added.

The other steps and parameters in the preparation method are consistent with that of Example 1.

Comparative Example 3

The difference between this Comparative Example and Example 1 is that only titanium niobate is used for coating in this Comparative Example.

The preparation method comprises:
(1) 3 g titanium dioxide, 30 g niobium pentoxide ($Nb_2O_5$) and 100 g asphalt were weighed and added into 2600 ml carbon tetrachloride organic solvent to make the content to be 5 wt %, and the materials were ball milled, spray dried, and sintered at 800° C. for 3 h, and crushed to obtain a pre-coating material; and
(2) 5 g of the pre-coating material in step (1) and 100 g of artificial graphite were put into a fusion machine, the materials were mixed at a speed of 40 Hz/min for 60 min, and then the mixture was added into a high-speed mixer for high-speed granulation, modification, and mixing, in which the granulation temperature is 700° C., and the granulation time is 3 h. Afterwards, under the protection of argon inert gas, the material was kept at a constant temperature of 1200° C. for 12 hours for carbonization treatment, to obtain the granulated graphite composite material. According to the national standard GB/T-24533-2009, "Graphite negative electrode materials for lithium-ion batteries", the powder conductivity of the negative electrode materials provided in Examples 1-6 and Comparative Examples 1-3 was tested. The test results are shown in Table 1 (Table 1 also shows the specific surface area, tap density, and median particle size of the graphite composite negative electrode materials).

TABLE 1

| | Powder conductivity (S/cm) | Specific surface area ($m^2/g$) | Tap density ($g/cm^3$) | Median particle size (μm) |
|---|---|---|---|---|
| Example1 | 51 | 1.72 | 1.15 | 12.4 |
| Example2 | 43 | 1.69 | 1.13 | 12.9 |
| Example 3 | 45 | 1.62 | 1.12 | 13.1 |
| Example 4 | 46 | 1.69 | 1.12 | 12.8 |
| Example 5 | 38 | 1.68 | 1.17 | 12.9 |
| Example 6 | 49 | 1.74 | 1.09 | 11.8 |
| Comparative Example1 | 15 | 1.24 | 0.98 | 15.3 |
| Comparative Example2 | 9 | 1.07 | 1.01 | 15.5 |
| Comparative Example3 | 12 | 1.09 | 1.04 | 14.3 |

From the data results of Examples 1-6, it can be seen that the graphite composite negative electrode materials provided in this disclosure have a powder conductivity of over 38 S/cm. From the data results of Example 1 and Examples 4-5, it can be seen that a ratio of the mass of titanium niobate is too small, which is not conducive to the improvement of powder conductivity. If a ratio of the mass of titanium niobate is too large, it will lead to an increase in ion impedance and a decrease in charging rate.

From the data results of Example 1 and Example 6, it can be seen that an excessive ratio of mass of carbon nanotubes can lead to an increase in specific surface area, a decrease in storage performance, a decrease in tap density, and an impact on energy density.

From the data results of Example 1 and Comparative Example 1, it can be seen that compared with simply carbon coating, the coating layer provided in this disclosure can better achieve the cycling performance of the material.

From the data results of Example 1 and Comparative Example 2, it can be seen that without the addition of catalyst, i.e. without carbon nanotubes in the coating layer, it is difficult to achieve an increase in material's electrical conductivity.

From the data results of Example 1 and Comparative Example 3, it can be seen that simply coating titanium niobate has the problem of poor coating quality and deteriorating cycling performance.

The graphite composite negative electrode materials prepared in Examples 1-6 and Comparative Examples 1-3 were assembled respectively into button batteries according to the following methods:

An adhesive, a conductive agent and a solvent were added into the negative electrode material, stirred and mixed evenly to prepare a negative electrode slurry. The negative electrode slurry was coated on a copper foil, dried, rolled, and cut to obtain a negative electrode plate. The adhesive is LA132 adhesive, the conductive agent is SP conductive agent, and the solvent is secondary distilled water. The weight ratio of the negative electrode material, SP conductive agent, LA132 adhesive, and secondary distilled water is 95:1:4:220. The metal lithium sheet was used as the counter electrode, a composite film of polyethylene (PE) film, polypropylene (PP) film, or polyethylene propylene (PEP) was used as a separator, and $LiPF_6$/EC+DEC (the concentration of $LiPF_6$ was 1.3 mol/L, and the volume ratio of EC and DEC was 1:1) was used as the electrolyte solution, and the battery was assembled in an argon filled glove box.

The prepared button batteries were installed respectively on the Wuhan LAND CT2001A type battery tester, and charged and discharged at a rate of 0.1 C. The charging and discharging voltage range was from 0.005V to 2.0V, and the first discharge capacity and first discharge efficiency were measured. Their discharge capacities at 3 C rate were tested. The results are shown in Table 2.

TABLE 2

|  | First discharge specific capacity (mAh/g) | First efficiency (%) | Discharge capacity ratio of 3 C/0.2 C (%) |
|---|---|---|---|
| Example 1 | 360.3 | 97.1 | 98.3 |
| Example 2 | 359.4 | 97.3 | 98.1 |
| Example 3 | 358.5 | 96.9 | 97.8 |
| Example 4 | 358.1 | 95.9 | 98.4 |
| Example 5 | 360.1 | 96.7 | 97.4 |
| Example 6 | 357.8 | 95.6 | 98.4 |
| Comparative Example1 | 352.2 | 93.1 | 89.1 |
| Comparative Example2 | 351.3 | 94.5 | 88.9 |
| Comparative Example3 | 352.3 | 93.2 | 87.6 |

From Table 2, it can be seen that the discharge capacity of the composite negative electrode materials provided in this disclosure is significantly higher than that of the Comparative Examples 1-3, with a first efficiency of over 95.6% at 0.1 C and a discharge capacity ratio of over 97.4% at 3 C/0.2 C. This indicates that the niobium titanium compound coated on the surface of the graphite material not only improves the first efficiency of the materials, but also has high electronic conductivity and rate performance.

Respectively, the negative electrode material prepared in Examples 1-6 and Comparative Examples 1-3 were used to prepare the negative electrodes, a ternary material ($LiNi_{1/3}Co_{1/3}Mn_{1/3}O_2$) was used as the positive electrode material to prepare the positive electrodes, $LiPF_6$ (the solvent was EC+DEC with a volume ratio of 1:1, and the concentration was 1.3 mol/L) was used as the electrolyte solution, and celegard2400 was used as the separators to prepare 2 Ah pouch batteries.

During the preparation of the negative electrodes, an adhesive, a conductive agent, and a solvent were added to the negative electrode material, stirred and mixed evenly to form the negative electrode slurry. The negative electrode slurry was coated on a copper foil, dried, rolled, and cut to obtain the negative electrode plate. The adhesive was LA132 adhesive, the conductive agent was SP conductive agent, and the solvent was secondary distilled water. The weight ratio of negative electrode material, SP conductive agent, LA132 adhesive and secondary distilled water was 95:1:4:220.

During the preparation of the positive electrode, an adhesive, a conductive agent, and a solvent were added to the positive electrode material, stirred and mixed evenly to form the positive electrode slurry. The positive electrode slurry was coated on an aluminum foil, dried, rolled, and cut to obtain the positive electrode plate. The adhesive was PVDF, the conductive agent was SP, and the solvent was N-methylpyrrolidone. The weight ratio of the positive electrode material, the conductive agent, the adhesive and the solvent was 93:3:4:140.

The pouch batteries provided for Examples 1-6 and Comparative Examples 1-3 were tested under the following conditions:

1) Rate Performance Test

The charging and discharging voltage range was 2.8-4.2V, and the testing temperature was 25±3.0° C. The batteries were charged at 1.0 C, 2.0 C, 3.0 C, 5.0 C, respectively, and discharged at 1.0 C. The constant current ratio and temperature of the batteries under different charging modes were tested. The results are shown in Table 3:

TABLE 3

| | Rate | 1C | 2C | 3C | 5C |
|---|---|---|---|---|---|
| Example 1 | Constant current ratio (%) | 97.91 | 93.79 | 89.93 | 80.24 |
| | Temperature (° C.) | 26.4 | 27.2 | 31.1 | 34.8 |
| Example 2 | Constant current ratio (%) | 97.11 | 92.79 | 87.93 | 78.24 |
| | Temperature (° C.) | 26.5 | 28.4 | 31.2 | 33.8 |
| Example 3 | Constant current ratio (%) | 96.91 | 92.99 | 88.91 | 76.24 |
| | Temperature (° C.) | 26.1 | 28.2 | 31.1 | 33.8 |
| Example 4 | Constant current ratio (%) | 96.97 | 93.01 | 88.92 | 77.01 |
| | Temperature (° C.) | 26.0 | 28.0 | 30.9 | 33.1 |
| Example 5 | Constant current ratio (%) | 95.91 | 91.19 | 86.99 | 73.14 |
| | Temperature (° C.) | 26.9 | 29.2 | 32.1 | 34.8 |
| Example 6 | Constant current ratio (%) | 97.92 | 93.82 | 89.99 | 80.64 |
| | Temperature (° C.) | 26.2 | 26.8 | 30.3 | 34.1 |
| Comparative Example1 | Constant current ratio (%) | 94.65 | 89.34 | 85.65 | 64.6 |
| | Temperature (° C.) | 28.3 | 31.4 | 37.5 | 39.9 |
| Comparative Example2 | Constant current ratio (%) | 93.15 | 88.24 | 84.44 | 63.61 |
| | Temperature (° C.) | 29.5 | 32.6 | 38.5 | 40.9 |
| Comparative Example3 | Constant current ratio (%) | 92.65 | 87.94 | 83.75 | 62.63 |
| | Temperature (° C.) | 29.6 | 33.6 | 38.4 | 41.2 |

From Table 3, it can be seen that the rate charging performance of the pouch batteries provided by the present disclosure is significantly better than that of the comparative examples, and the charging time is shorter, indicating that the composite negative electrode materials of the present disclosure have good fast charging performance. Because the migration of lithium ions is required during the charging process of the battery, the composite material provided by Examples 1-3 of the present disclosure has titanium niobate with high electronic conductivity on the surface, which provides convenience for the intercalation and deintercalation of lithium ions, improves its rate performance, and reduces its temperature rise.

2) Cyclic Performance Testing

The following experiments were conducted on the pouch batteries made with the materials of Examples 1-6 and Comparative Examples 1-3:100, 300, and 500 charge and discharge cycles were conducted at a 2 C/2 C charge and discharge rate, with a voltage range of 2.8-4.2V, to test the capacity retention rate thereof. The results are shown in Table 4:

TABLE 4

|  | Initial capacity retention rate (%) | Capacity retention rate after 100 cycles (%) | Capacity retention rate after 300 cycles (%) | Capacity retention rate after 500 cycles (%) |
| --- | --- | --- | --- | --- |
| Example 1 | 100 | 99.47 | 97.02 | 96.14 |
| Example 2 | 100 | 99.36 | 96.95 | 96.12 |
| Example 3 | 100 | 99.28 | 96.81 | 95.05 |
| Example 4 | 100 | 99.18 | 96.89 | 95.98 |
| Example 5 | 100 | 99.08 | 96.45 | 94.99 |
| Example 6 | 100 | 99.18 | 95.82 | 94.95 |
| Comparative Example1 | 100 | 98.19 | 94.27 | 93.41 |
| Comparative Example2 | 100 | 97.11 | 93.23 | 93.11 |
| Comparative Example3 | 100 | 97.23 | 93.54 | 92.98 |

From Table 4, it can be seen that, as for the cycling performance of the lithium-ion batteries prepared by the composite negative electrode materials (Examples 1-3) prepared in this disclosure, when charging and discharging test at 2 C/2 C was tested, the capacity retention rate after 100 cycles can reach over 99.08%, the capacity retention rate after 200 cycles can reach over 95.82%, and the capacity retention rate after 500 cycles can reach over 94.95%, which are significantly better than that of the Comparative Examples 1-3 in all stages. The graphite surface coated with titanium niobate and carbon nanotubes can improve the transmission rate of lithium ions, thereby improving the cycling performance of the battery.

Based on the data from Tables 2, 3, and 4, it can be known that:

The first efficiency, rate, and cycling performance of both button battery and full battery provided in this disclosure have been significantly improved.

From the data results of Example 1 and Examples 4-5, it can be seen that, if a ratio of the mass of titanium niobate is too small, it is not conducive to structural stability, and the cycling performance is unfavorable; and if a ratio of the mass of titanium niobate is too large, the adhesion between materials will be poor, which can lead to poor cycling.

From the data results of Example 1 and Example 6, it can be seen that, if a ratio of the mass of carbon nanotubes is excessive, it can lead to poor storage performance, thereby reducing cycling performance.

From the data results of Example 1 and Comparative Example 1, it can be seen that compared with simple carbon coating, the coating layer provided in this disclosure can better achieve the bonding force between materials and improve cycling performance.

From the data results of Example 1 and Comparative Example 2, it can be seen that without the addition of catalyst, i.e. without carbon nanotubes in the coating layer, it is difficult to achieve impedance reduction, which affects the long-term cycling performance of the materials.

From the data results of Example 1 and Comparative Example 3, it can be seen that simply coating titanium niobate has a problem of poor adhesion between the core and shell.

In summary, in this disclosure, by coating the surface of graphite with a coating layer of mixed various substances and utilizing the relatively high theoretical specific capacity of titanium niobate, the lattice parameters and cell volume during the lithium ion deintercalation process have relatively small changes and high reversibility. And its charge and discharge potential is around 1.6V, which makes it difficult to generate SEI films and lithium dendrites during the cycling process. At the same time, it assists in the addition of carbon nanotubes and amorphous carbon, the carbon nanotubes form a network structure, and the amorphous carbon stabilizes the structure of materials, jointly improving the stability of the material's structure during the charge and discharge process, and enhancing the material's first efficiency, power, and cycling performance.

The invention claimed is:

1. A graphite composite negative electrode material, the graphite composite negative electrode material comprises a core and a coating layer which is coated on the surface of the core, the core comprises graphite material, and the coating layer comprises titanium niobate, carbon nanotubes, and amorphous carbon; and the graphite composite negative electrode material is prepared by the following methods, which comprises:
(1) mixing a titanium source, a niobium source, an asphalt and a solvent, spray drying and sintering to obtain a pre-coating material;
(2) mixing the pre-coating material in step (1) with a solution of a metal catalyst to obtain a mixture, and compositing a carbon source with the mixture in a manner of vapor deposition to obtain a coating layer material; and
(3) mixing the coating layer material in step (2) with a graphite material, granulating, and carbonizing to obtain the graphite composite negative electrode material.

2. The graphite composite negative electrode material of claim 1, wherein based on 100% of the mass of the graphite composite negative electrode material, a ratio of the mass of the coating layer is in a range from 1% to 10%; based on 100% of the mass of the coating layer, a ratio of the mass of the titanium niobate is in a range from 10% to 50%; and based on 100% of the mass of the coating layer, a ratio of the mass of the carbon nanotube is in a range from 1% to 5%.

3. The graphite composite negative electrode material of claim 1, wherein the chemical formula of the titanium niobate is $Ti_{1-x}Nb_xO_7$, $0<x<1$.

4. The graphite composite negative electrode material of claim 1, wherein a specific surface area of the graphite composite negative electrode material is in a range from 0.5 m$^2$/g to 10 m$^2$/g, a median particle size of the graphite composite negative electrode material is in a range from 5 μm to 20 μm, and a tap density of the graphite composite negative electrode material is in a range from 0.6 g/cm$^3$ to 1.4 g/cm$^3$.

5. The graphite composite negative electrode material of claim 4, wherein the specific surface area of the graphite composite negative electrode material is in a range from 1 m$^2$/g to 5 m$^2$/g, the median particle size of the graphite composite negative electrode material is in a range from 9 μm to 15 μm, and the tap density of the graphite composite negative electrode material is in a range from 0.9 g/cm$^3$ to 1.2 g/cm$^3$.

6. A method for preparing the graphite composite negative electrode material of claim 1, comprising the following steps:

(1) mixing a titanium source, a niobium source, an asphalt and a solvent, spray drying and sintering to obtain a pre-coating material;

(2) mixing the pre-coating material in step (1) with a solution of a metal catalyst to obtain a mixture, and compositing a carbon source with the mixture in a manner of vapor deposition to obtain a coating layer material; and (3) mixing the coating layer material in step (2) with a graphite material, granulating, and carbonizing to obtain the graphite composite negative electrode material.

7. The method for preparing the graphite composite negative electrode material of claim 6, wherein the titanium source in step (1) comprises titanium dioxide; the niobium source in step (1) comprises any one or a combination of at least two of niobium pentoxide, niobium trioxide, niobium oxide, and niobium hydroxide; the solvent in step (1) comprises any one or a combination of at least two of carbon tetrachloride, n-hexane, xylene, N-methylpyrrolidone and tetrahydrofuran; and a mass ratio of the titanium source, the niobium source, and the asphalt in step (1) is (1-5):(10-50):100.

8. The method for preparing the graphite composite negative electrode material of claim 6, wherein the sintering in step (1) is carried out at a temperature ranging from 600° C. to 1000° C. for a time period ranging from 1 hour to 6 hours.

9. The method for preparing the graphite composite negative electrode material of claim 6, wherein the median particle size of the metal catalyst in step (2) is in a range from 10 nm to 500 nm; the metal catalyst in step (2) comprises any one or a combination of at least two of nano-iron, nano-nickel, and nano-cobalt; in step (2), the mass ratio of the pre-coating material to the metal catalyst is 100:(0.5-2); the mixing in step (2) is carried out for a time period ranging from 1 hour to 24 hours; and wherein the mixed substances in step (2) are subsequently filtered and dried in a vacuum to obtain a mixture.

10. The method for preparing the graphite composite negative electrode material of claim 6, wherein the vapor deposition in step (2) is carried out at a temperature ranging from 600° C. to 1000° C. for a time period ranging from 1 hour to 12 hours, and the carbon source for vapor deposition in step (2) includes any one or a combination of at least two of methane, ethane, ethylene, acetylene, propane, and propylene.

11. The method for preparing the graphite composite negative electrode material of claim 6, wherein in step (3), a mass ratio of the coating layer material to the graphite material is (1-10):100.

12. The method for preparing the graphite composite negative electrode material of claim 6, wherein the mixing in step (3) is carried out for a time period ranging from 30 minutes to 120 minutes.

13. The method for preparing the graphite composite negative electrode material of claim 6, wherein the granulating in step (3) is carried out at a temperature ranging from 600° C. to 800° C. for a time period ranging from 1 hour to 6 hours.

14. The method for preparing the graphite composite negative electrode material of claim 6, wherein the method for preparing the graphite composite negative electrode material comprises the following steps:

(1) mixing a titanium source, a niobium source and an asphalt in a mass ratio of (1-5):(10-50):100 with a solvent, spray drying and sintering at 600° C. to 1000° C. for 1 hour to 6 hours to obtain a pre-coating material;

(2) mixing the pre-coating material in step (1) with a solution of a metal catalyst with a median particle size of 10 nm to 500 nm in a mass ratio of the pre-coating material to the metal catalyst of 100:(0.5-2) for 1 hour to 24 hours to obtain a mixture, and compositing a carbon source with the mixture at 600° C. to 1000° C. for 1 hour to 12 hours in a manner of a vapor deposition to obtain a coating layer material; and (3) mixing the coating layer material in step (2) with a graphite material in a mass ratio of (1-10):100 for 30 minutes to 120 minutes, granulating at 600° C. to 800° C. for 1 hour to 6 hours, and carbonizing at a carbonizing temperature of 1000° C. to 1300° C. for 6 hours to 24 hours to obtain the graphite composite negative electrode material.

15. A lithium-ion battery, comprising the graphite composite negative electrode material of claim 1.

16. The graphite composite negative electrode material of claim 13, wherein the carbonizing in step (3) is carried out at a temperature ranging from 1000° C. to 1300° C. for a time period ranging from 6 hours to 24 hours.

* * * * *